United States Patent [19]
Bur et al.

[11] Patent Number: 5,334,808
[45] Date of Patent: Aug. 2, 1994

[54] DRAW-OUT MOLDED CASE CIRCUIT BREAKER

[75] Inventors: Marc Bur, Grenoble; Jean-Pierre Nebon, St. Martin le Vinoux, both of France

[73] Assignee: Merlin Gerin, France

[21] Appl. No.: 43,380

[22] Filed: Apr. 6, 1993

[30] Foreign Application Priority Data

Apr. 23, 1992 [FR] France ................. 92 05137

[51] Int. Cl.⁵ .............................. H02B 1/04
[52] U.S. Cl. .................. 200/50 AA; 200/50 C; 361/609
[58] Field of Search .............. 361/31, 88, 605, 608, 361/609, 615; 200/50 R, 50 AA, 50 C, 318, 323, 324

[56] References Cited

U.S. PATENT DOCUMENTS

| | | | |
|---|---|---|---|
| 2,805,294 | 9/1957 | Edmunds | 200/51 R |
| 3,343,042 | 9/1967 | Cellerini et al. | 317/112 |
| 4,574,170 | 3/1986 | Abe et al. | 200/50 C |
| 4,761,521 | 8/1988 | Beck et al. | 200/50 AA |
| 4,808,777 | 2/1989 | Kindberg | 200/323 |
| 5,172,300 | 12/1992 | Morby et al. | 361/355 |

FOREIGN PATENT DOCUMENTS 0411871  2/1991  European Pat. Off. .
2594266  8/1987  France .

*Primary Examiner*—Gerald P. Tolin
*Attorney, Agent, or Firm*—Parkhurst, Wendel & Rossi

[57] ABSTRACT

A circuit breaker assembly is equipped with a pre-tripping device comprising a fixed cam securedly united to a connecting base, which cooperates with a rocker and a transmission lever when the circuit breaker is drawn-in and drawn-out from the connecting base. The profile of the fixed cam is chosen to actuate the transmission lever and impose tripping of the circuit breaker, during draw-in or draw-out travel, whereas the transmission lever is in the inactive position after the circuit breaker is drawn-in or drawn-out, in which the latter can be opened or closed normally.

8 Claims, 10 Drawing Sheets

DRAW-OUT MOLDED CASE CIRCUIT BREAKER

BACKGROUND OF THE INVENTION

The invention relates to a draw-out low-voltage molded case circuit breaker comprising a fixed part, notably a connecting base or frame provided with stationary draw-in contacts, and a movable part able to be moved between a drawn-in position and a drawn-out position of the fixed part and having movable draw-in contacts which cooperate in the drawn-in position with the stationary draw-in contacts, said movable part comprising said molded case and housed inside the molded case breaking contacts, an operating mechanism for opening and closing of the breaking contacts and a trip device which brings about opening of the breaking contacts when a fault occurs.

A draw-out circuit breaker mounted on a base or a frame can be extracted or replaced quickly without access being had to the live parts, and with the installation remaining in service. For safety reasons, it is forbidden to draw-out an on-load circuit breaker and safety measures, automatically causing tripping of the circuit breaker in the course of the draw-out operation, have already been proposed. Such a device comprises for example a pin protruding out from the rear panel of the molded case, and cooperating with the trip bar of the circuit breaker to prevent any closing of the circuit breaker and to cause it to open as soon as the pin is in the protruding position. When the circuit breaker is fitted on the base or frame, the pin is pushed in so as to release the trip bar enabling the circuit breaker to be closed. The assembly is arranged to bring about tripping of the circuit breaker before it is drawn-out, and to prevent reclosing of the circuit breaker until the latter has been drawn-in again. Any incorrect operation is thus prevented, and draw-in and draw-out of the circuit breaker can be performed in perfect safety. The shortcoming of the state-of-the-art device is that it prevents tests being carried out on the drawn-out circuit breaker. To close the circuit breaker when it is drawn-out, it is in fact indispensable to press the pin in and to lock it in this depressed position, with the risk of a circuit breaker being drawn-in whose pin is locked and whose contacts are closed.

The object of the present invention is to achieve a draw-out circuit breaker equipped with a pre-tripping device, preventing any incorrect operation and enabling tests to be carried out on the apparatus in the drawn-out position.

SUMMARY OF THE INVENTION

The circuit breaker according to the invention is characterized in that said fixed part bears a fixed cam commanding pre-tripping of the circuit breaker, that said movable part bears a transmission lever which cooperates on the one hand with the trip device, and on the other hand with said fixed cam, that in the drawn-in position said transmission lever is in the inactive position enabling opening and closing of the breaking contacts, that during the movement of the movable part from the drawn-in position to the drawn-out position and before separation of the stationary and movable draw-in contacts, the fixed cam cooperates with the transmission lever to actuate said trip device and brings about or confirms opening of the breaking contacts, and that in the drawn-out position said transmission lever is once more in the inactive position enabling opening and closing of the breaking contacts.

The cam actuates the transmission lever in the course of draw-in and draw-out travel, respectively before closing of the draw-in contacts and before separation of the draw-in contacts, so as to prevent draw-in or draw-out of a circuit breaker in the closed position. In both the drawn-in and drawn-out position, the transmission lever is in the inactive position and the circuit breaker can be opened or closed normally. This opening and closing is however prevented when the circuit breaker is in an intermediate position between draw-in and draw-out to bring about either opening of the closed circuit breaker, or to prevent this circuit breaker being closed so long as it is in the intermediate position.

The transmission lever passes through an orifice arranged in the rear panel of the molded case and is slidingly mounted in a passage extending in the draw-in or draw-out direction of the circuit breaker. The end of the transmission lever protruding out from the rear panel of the molded case is articulated on one of the arms of a rocker, whose other arm bears a cam follower part, notably a roller which in the course of draw-in or draw-out travel cooperates with the fixed cam, the assembly being arranged to transform a movement appreciably parallel to the rear panel of the molded case, imposed by the fixed cam, into a sliding movement of the transmission lever, in the stationary draw-in or draw-out direction. The draw-in contacts are advantageously tulip-finger contacts which cooperate with the movable draw-in contacts which are advantageously contact studs protruding out from the rear panel of the molded case. Guiding of the circuit breaker is performed by insulating sleeves, extending the stationary tulip-finger contacts and cooperating with the contact studs to position and guide the circuit breaker in the course of the draw-in and draw-out operation. The same transmission lever can be used to perform other functions, notably interlock functions between two circuit breakers, the transmission lever then being actuated by an interlock device which prevents any simultaneous closing of the two circuit breakers.

BRIEF DESCRIPTION OF THE DRAWINGS

Other advantages and features will become more clearly apparent from the following description of an illustrative embodiment of the invention, given as a non-restrictive example only and represented in the accompanying drawings in which.

DESCRIPTION OF THE PREFERRED EMBODIMENT

Figure 1:
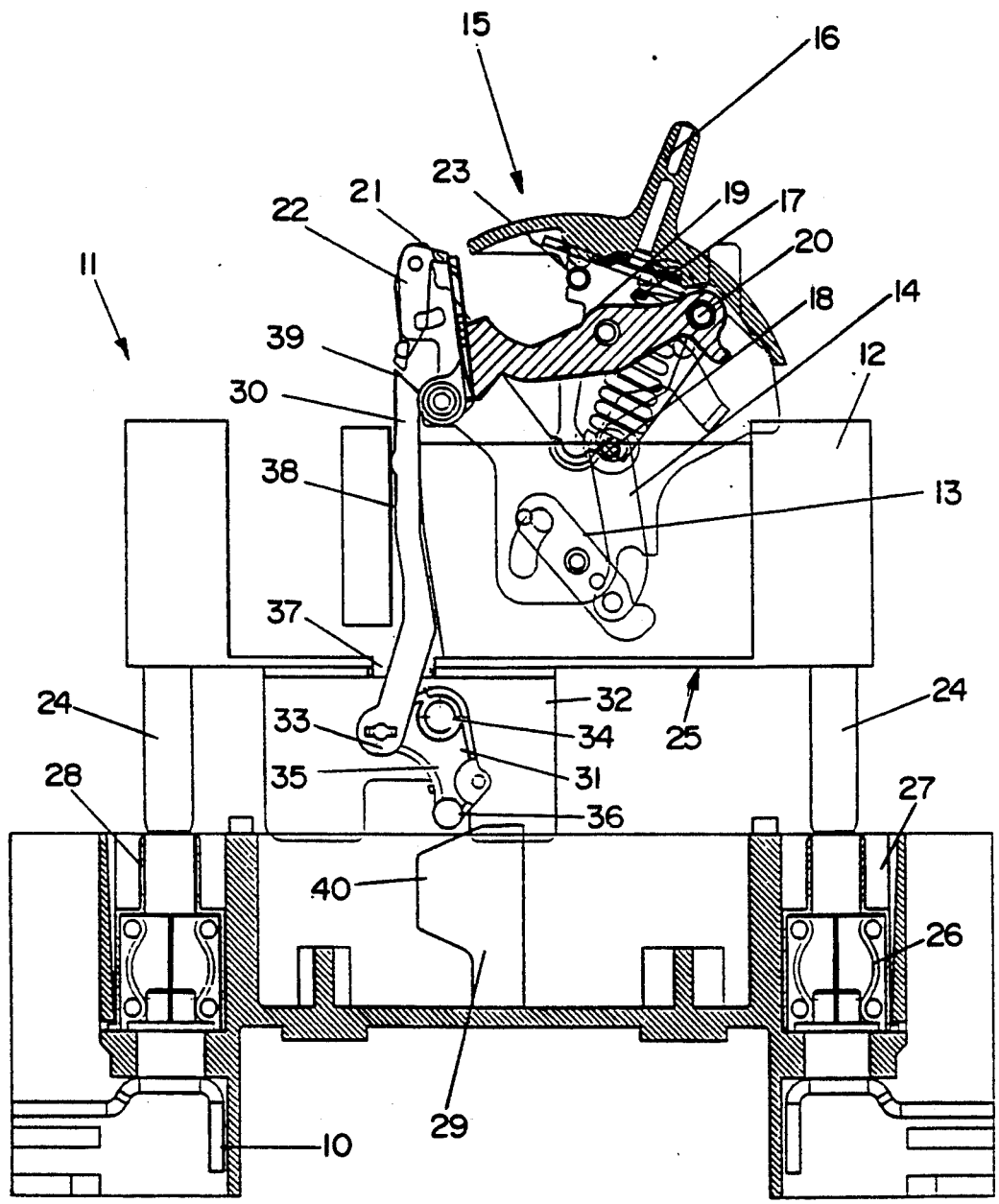
FIG. 1 is a schematic elevational and axial cross-sectional view of a circuit breaker according to the invention, represented in the drawn-out position.
Figure 2:
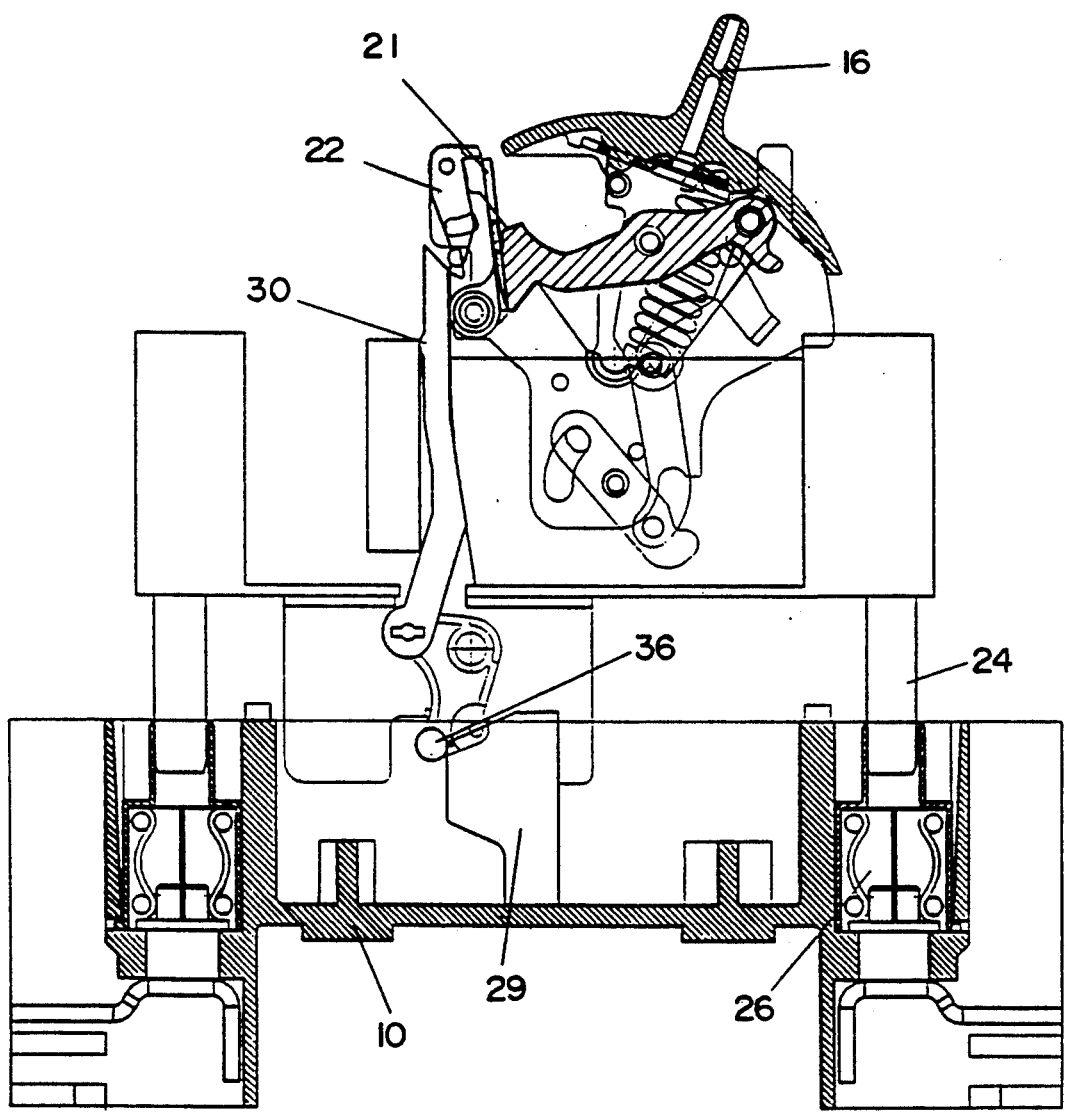
FIGS. 2, 3 and 4 are similar views to that of FIG. 1, showing respectively the circuit breaker in the course of draw-in, in the drawn-in position, and in the course of draw-out.

In FIGS. 1 to 4, a draw-out circuit breaker is formed by a fixed part 10 in the form of a base or frame, and a movable circuit breaker proper 11, i.e. a circuit breaker with a molded case 12, only the base of which is represented. The circuit breaker 11, of standard type, comprises a bar 53 supporting the movable contacts 52 of the different poles, with which bar there is associated an operating crank 13 coupled to a toggle 14 of an opening and closing mechanism 15 of the circuit breaker. A pivoting handle 16 controls manual opening and closing of the circuit breaker by means of a spring 17 secured on the one hand to the spindle 18 of the toggle, and on the other hand to the handle 16. The opposite end of the toggle 14 is articulated on a hook 19, one end of which is pivotally mounted on a fixed spindle 20 and the other end of which cooperates with a latch 21. In the locked position, the hook 19 exerts a force on the locking surface of the latch 21 in the unlocking direction, by counterclockwise pivoting, the latch 21 being held in the locked position by a pivoting catch 22. The circuit breaker 11 comprises in addition a trip device (not represented) which actuates the catch 22 when a fault occurs to bring about automatic opening of the circuit breaker by releasing of the latch 21 and unlocking of the hook 19. FIG. 1 represents the mechanism 15 in the closed position of the circuit breaker, opening of the latter being able to be commanded manually by counterclockwise pivoting of the handle 16, or by an automatic trip caused by the trip device.

When tripping takes place, the handle 16 moves to an intermediate position, and resetting of the mechanism 15 is achieved by pivoting of the handle 16 to the open position. In the course of this pivoting, a roller 23 securedly united to the handle 16 engages the hook 19 to move it back to the position locked by the latch 21. This resetting position which corresponds to the open position, is a stable position of the handle 16, the latter remaining in this position, even when the catch 22 is unlocked by the trip device.

A circuit breaker of this kind is described in detail in U.S. patent application Ser. No. 08/006,795 filed by the applicant on Jan. 21, 1993, and the reader should advantageously refer to this application for further details.

Stud contacts 24 protruding out from the rear panel 25 of the molded case 12 are connected to the input and output connectors 55, 56 of the different poles of the circuit breaker 11. When the circuit breaker 11 is drawn-in on the base 10, each contact stud 24 stationary draw-in contact formed by a tulip-finger 26. The base 10 is formed by an insulating plate having recesses 27 housing the tulip-finger contacts 26 facing the rear panel 25 of the molded case 12. The tulip-finger contacts 26 are extended in the direction of this rear panel 25, by insulating guide sleeves 28, which cooperate with the contact studs 24 to position and guide the circuit breaker 11 in the course of draw-in and draw-out travel.

The circuit breaker 11 is equipped with a pre-tripping system formed on the one hand by a fixed cam 29, supported by the base 10, and on the other hand by a system securely united to the movable part formed by a support bracket 32, fixed to the rear panel 25 of the case 12, which bracket bears a rocker 31 one of whose arms 33 is articulated on a transmission lever 30. The rocker 31 is pivotally mounted on a spindle 34, securely united to the bracket 32, and the opposite arm 35 of the rocker 31 bears a pin 36 able to cooperate with the fixed cam 29. The transmission lever 30 passes through an orifice 37 of the rear panel 25, and a passage 38 arranged inside the case 12, and is terminated by a face 39 actuating the catch 22. The fixed cam 29, rocker 31 and transmission lever 30 extend in a plane parallel to the draw-in and draw-out direction of the circuit breaker 11, which direction is perpendicular to the rear panel 25. The arm 35 bearing the pin 36 of the rocker 31 extends appreciably in this direction perpendicular to the rear panel 25, whereas the arm 33 articulated on the transmission lever 30 is appreciably perpendicular. The profile 40 of the fixed cam comprises a crenellated part which cooperates with the pin 36 to move the latter in the course of a draw-in movement of the circuit breaker 11, to the left in FIG. 1, and to then keep this pin in the diverted position before releasing it at the end of draw-in travel. This leftwards diverting movement of the pin 36 causes clockwise pivoting of the rocker 31 and upwards sliding in FIG. 1 of the transmission lever 30, whose face 39 engages the catch 22 to release the latch 21. Release of the pin 36 enables reverse pivoting of the rocker 31 and downwards sliding of the transmission lever 30 which enables the latch 21 to be latched again.

Figure 3:
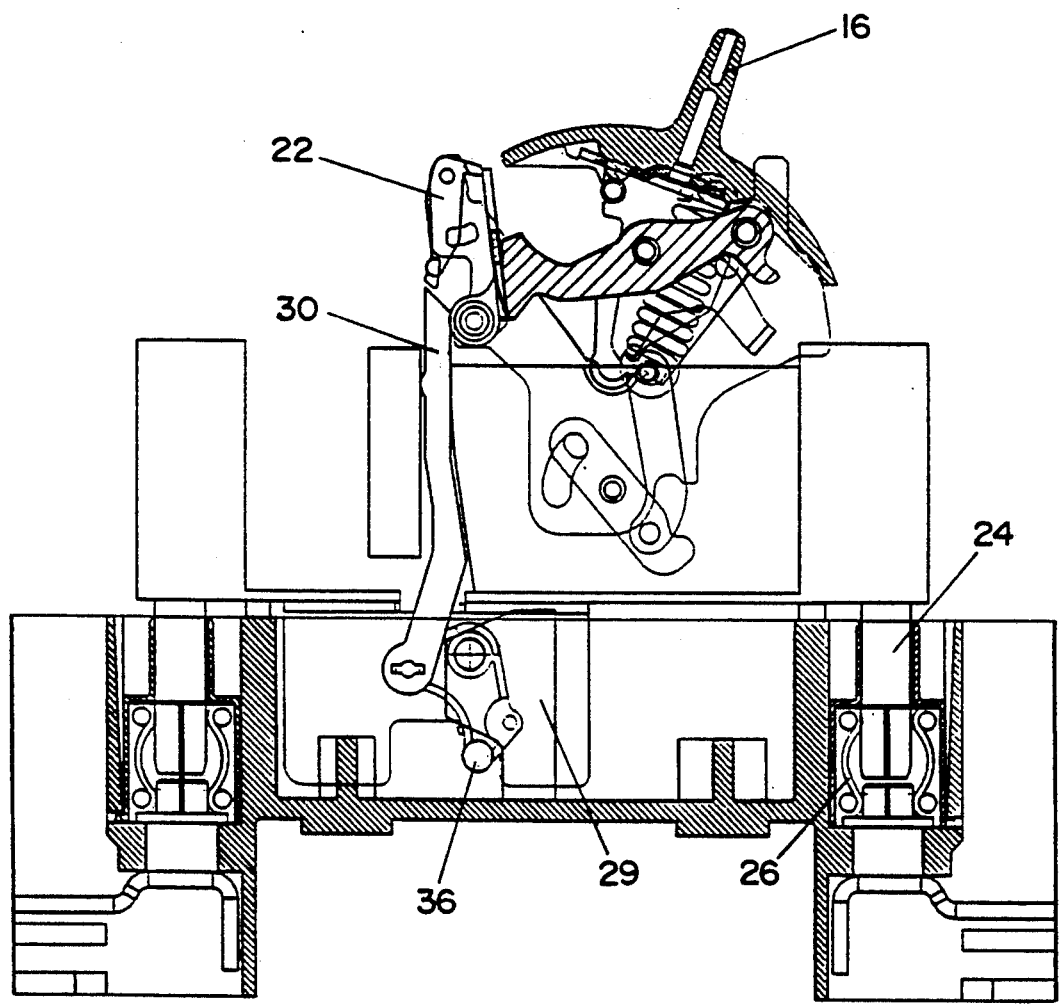
Figure 4:
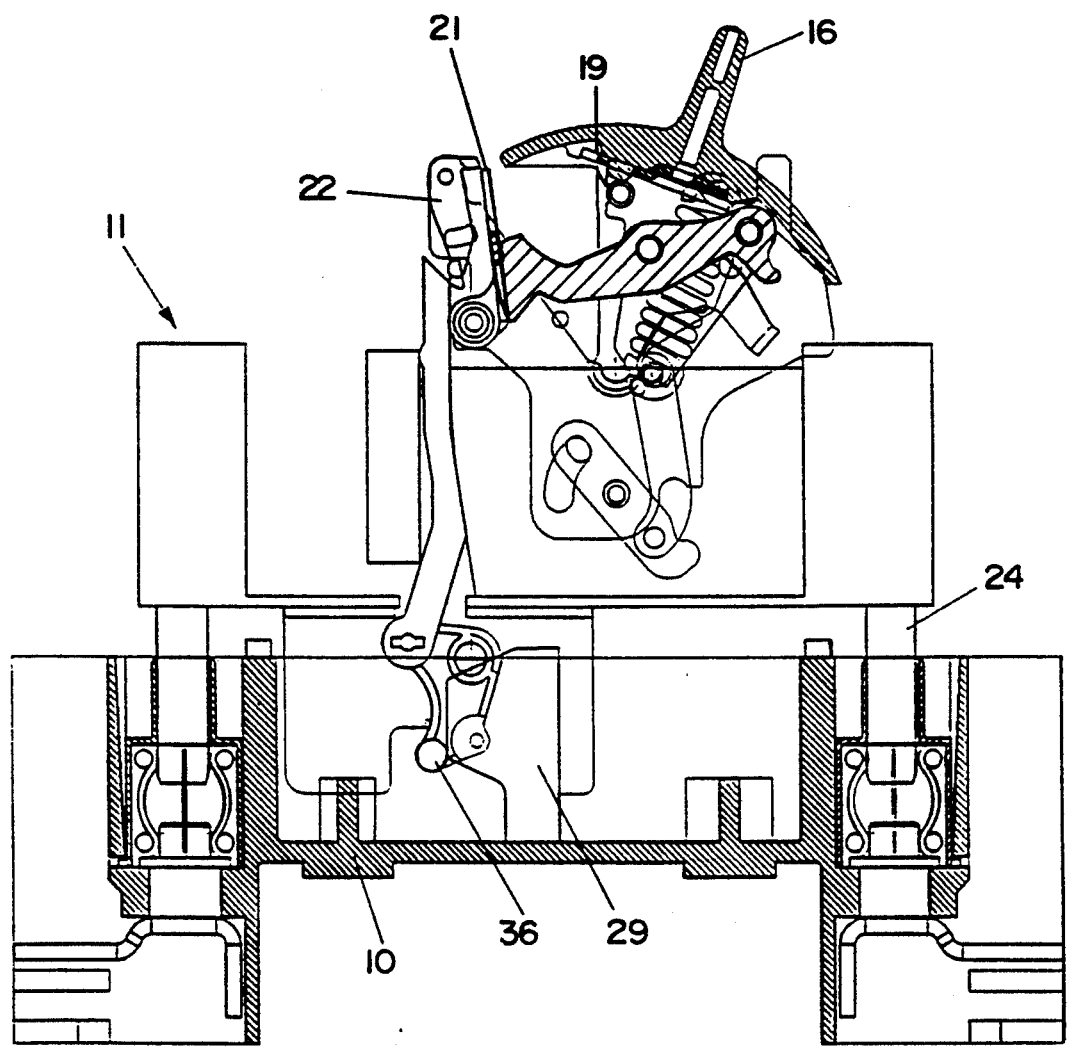

The device operates as follows:

The circuit breaker being in the closed position, represented in FIG. 1 and drawn-out, the draw-in movement of the circuit breaker 11 onto the base 10 is initiated by inserting the contact studs 24 into the sleeves 28. In this position, the pin 36 has not yet engaged the fixed cam 29, and the latch 21 maintains the hook 19. Continued draw-in movement brings the circuit breaker 11 into the position represented in FIG. 2, in which the contact studs 24 are still separated from the tulip-fingers 26 and in which the fixed cam 29 has moved the pin 36 to the left in FIG. 2, bringing about upwards sliding of the transmission lever 30, which has made the catch 22 pivot. The latch 21 thus released enables pivoting of the hook 19 and tripping of the circuit breaker whose contacts open. The circuit breaker being open, it can be drawn-in without any risk, and at the end of draw-in travel, the pin 36 passes over the crenellated part of profile 40 and is again released from the fixed cam 29 to return to the initial position of movement to the right. In this drawn-in position, the transmission lever 30 is inactive, and the circuit breaker can be opened or closed normally by actuating the handle 16, FIG. 3 representing the drawn-in circuit breaker in the closed position. Draw-out is achieved by a reverse operation, and in the first stage the pin 36 engages the cam 29 and is moved to the left in FIG. 4, to actuate the transmission lever 30 and bring about tripping of the circuit breaker 11, by release of the catch 22 and latch 21. Tripping takes place before separation of the draw-in contacts 24, 26 which takes place afterwards, the circuit breaker being off-load. At the end of the draw-out travel and in the drawn-out position, the pin 36 leaves the fixed cam 29 and returns to the initial position releasing the catch 22 and latch 21, enabling normal operation of the circuit breaker, notably opening and closing to perform testing.

It can easily be seen that the pre-tripping device can be associated with a standard circuit breaker, by simple fixing of the support 32, with the rocker 31 and transmission lever 30. The pre-tripping system is particularly simple and it prevents any operating error.

Figure 5:
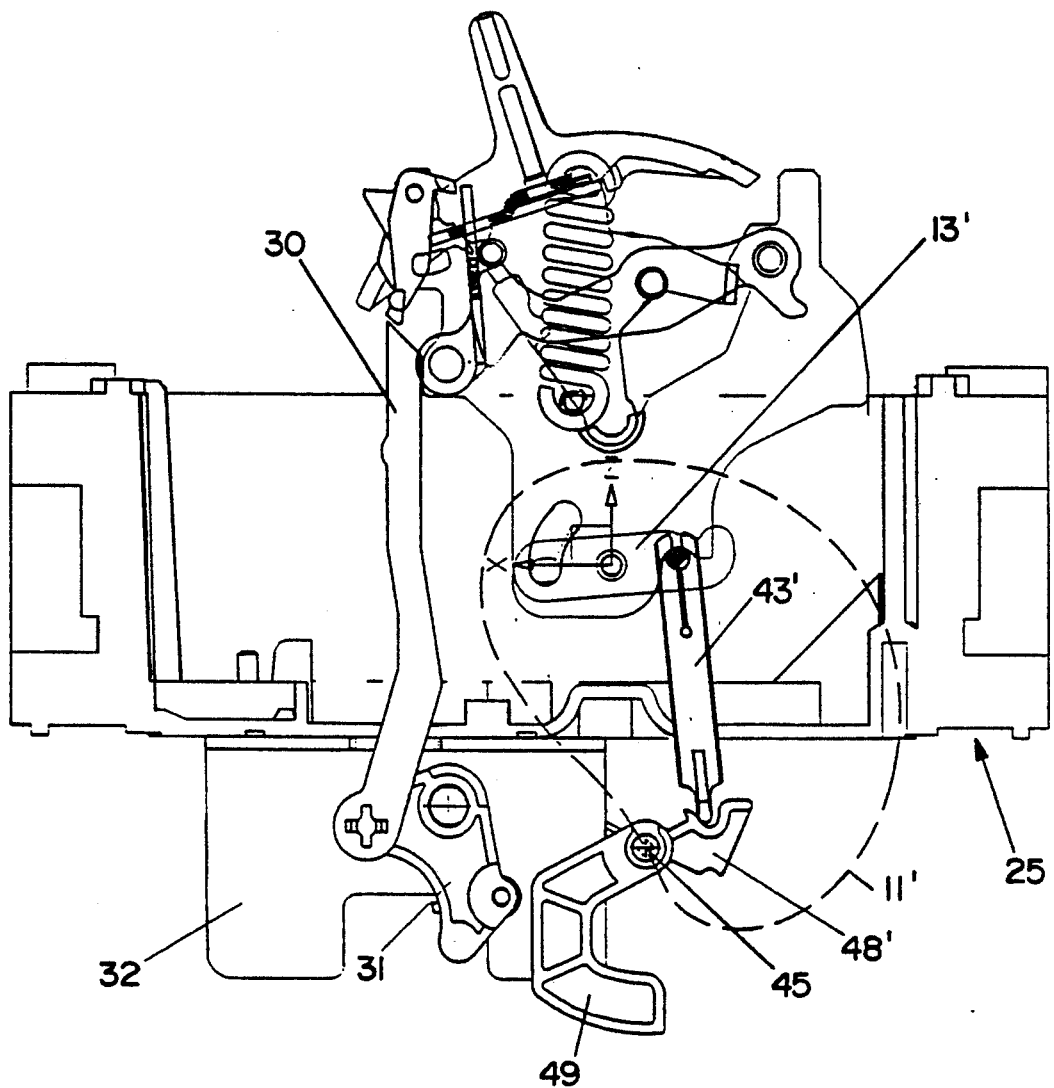
FIG. 5 is an elevational and axial cross-sectional view of an device for interlocking two circuit breakers, a part encircled by an unbroken line being represented in the position corresponding to the associated circuit breaker.
Figure 6:
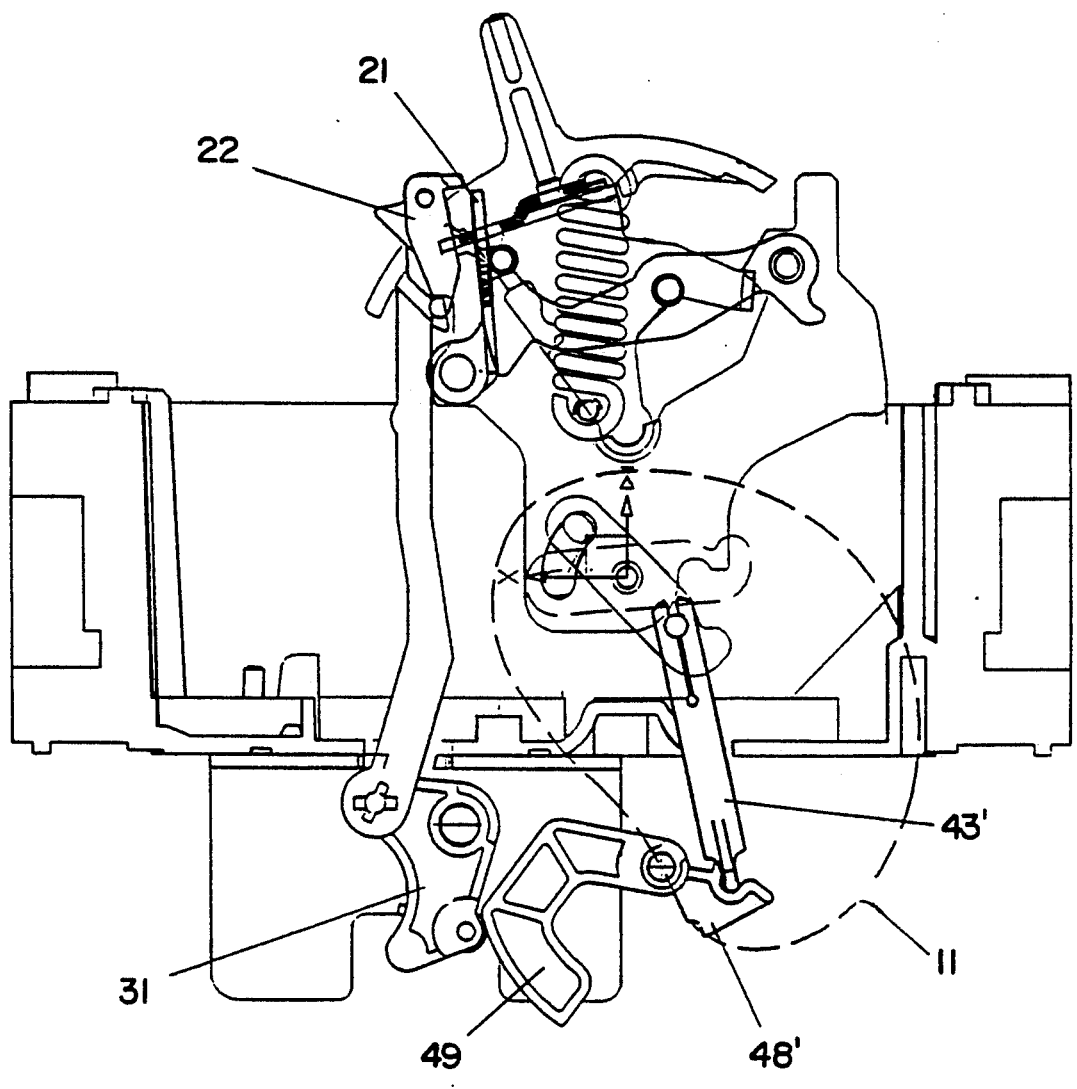
FIG. 6 is a similar view to that of FIG. 5, showing the interlock device in the tripping position.
Figure 7:
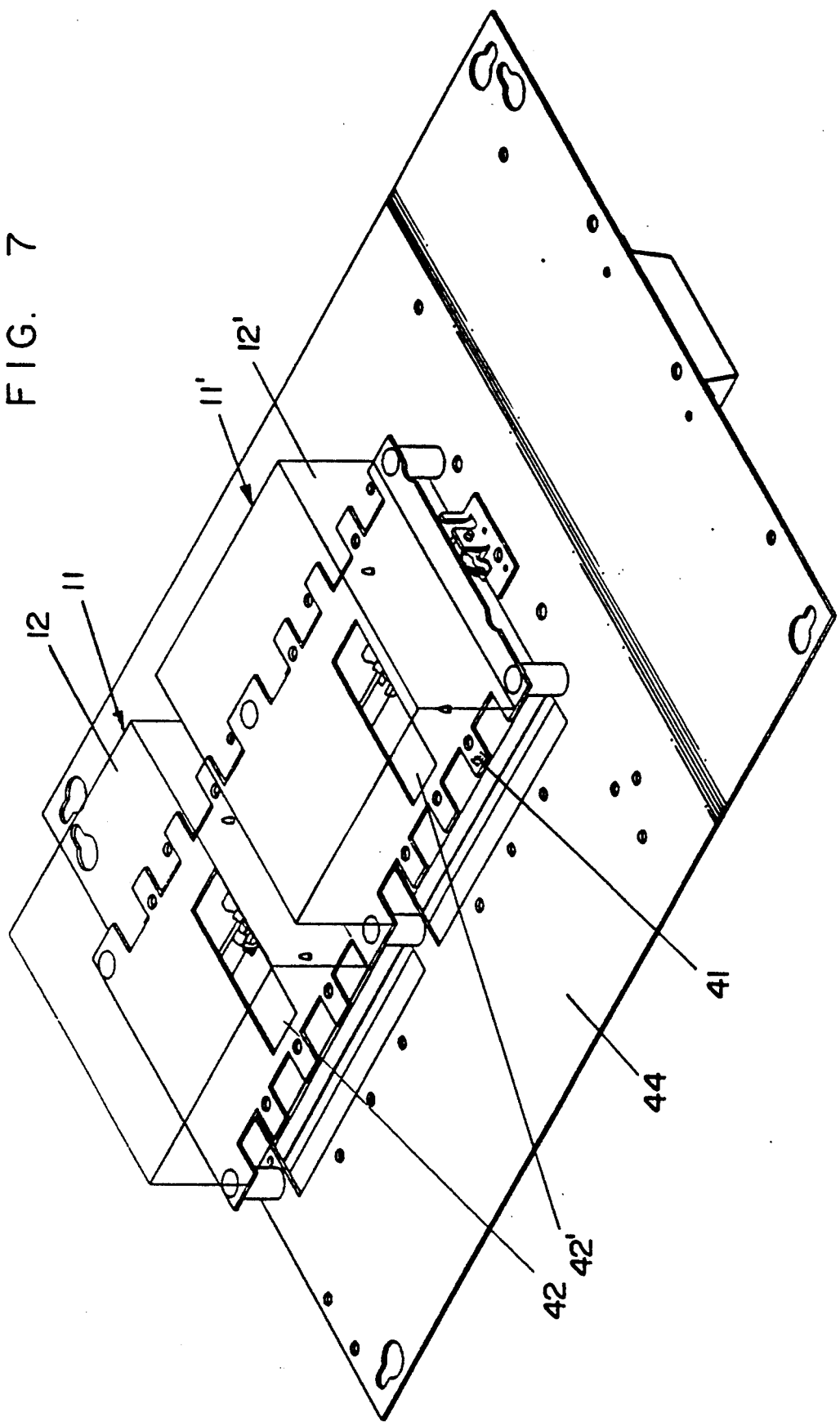
FIG. 7 is a perspective view of a fixing plate of two circuit breakers equipped with an interlock device, only the cases of the circuit breakers being partially represented.
Figure 8:
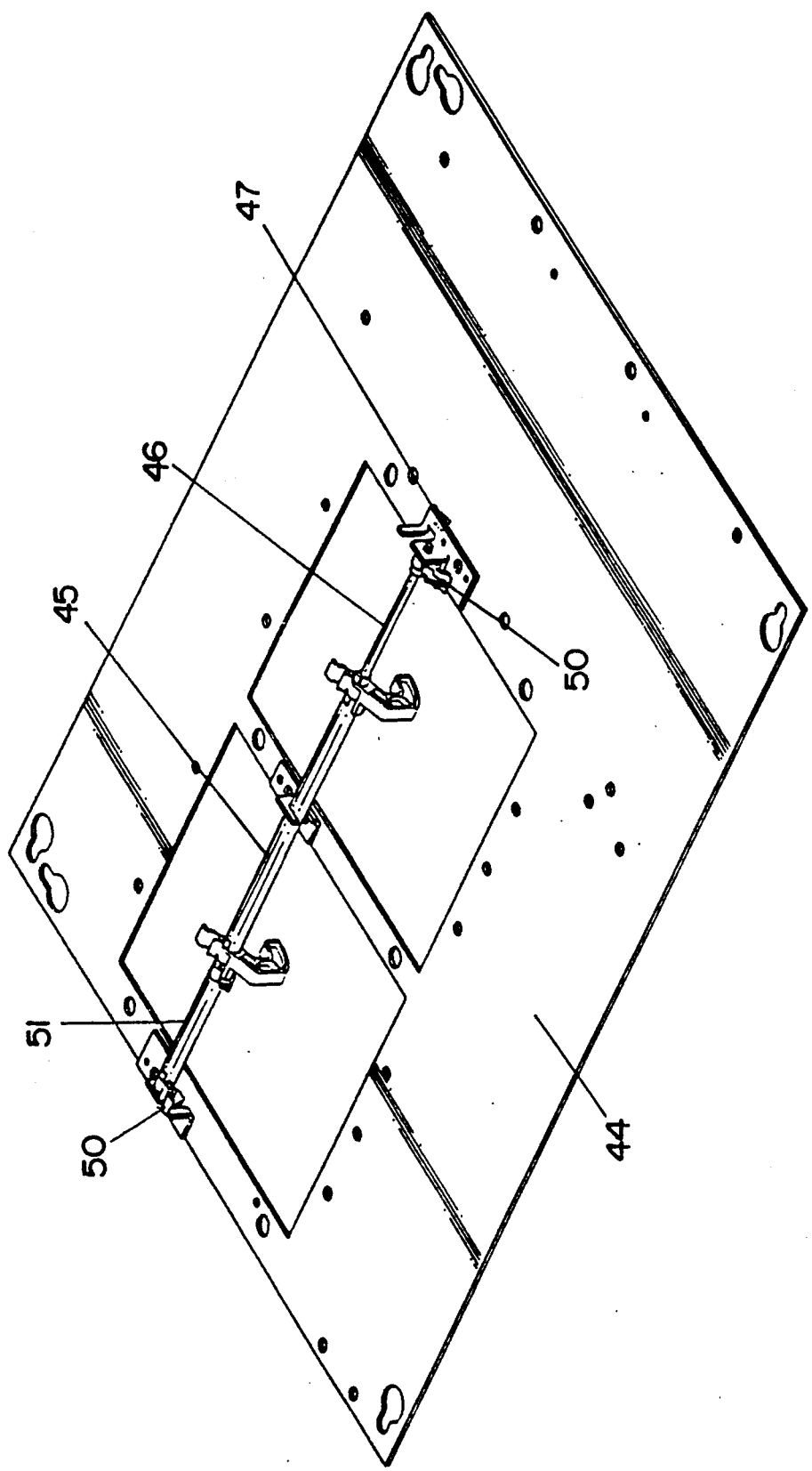
FIG. 8 is a similar view to that of FIG. 7, in which one of the parts of the plate is assumed to have been removed.
Figure 9:
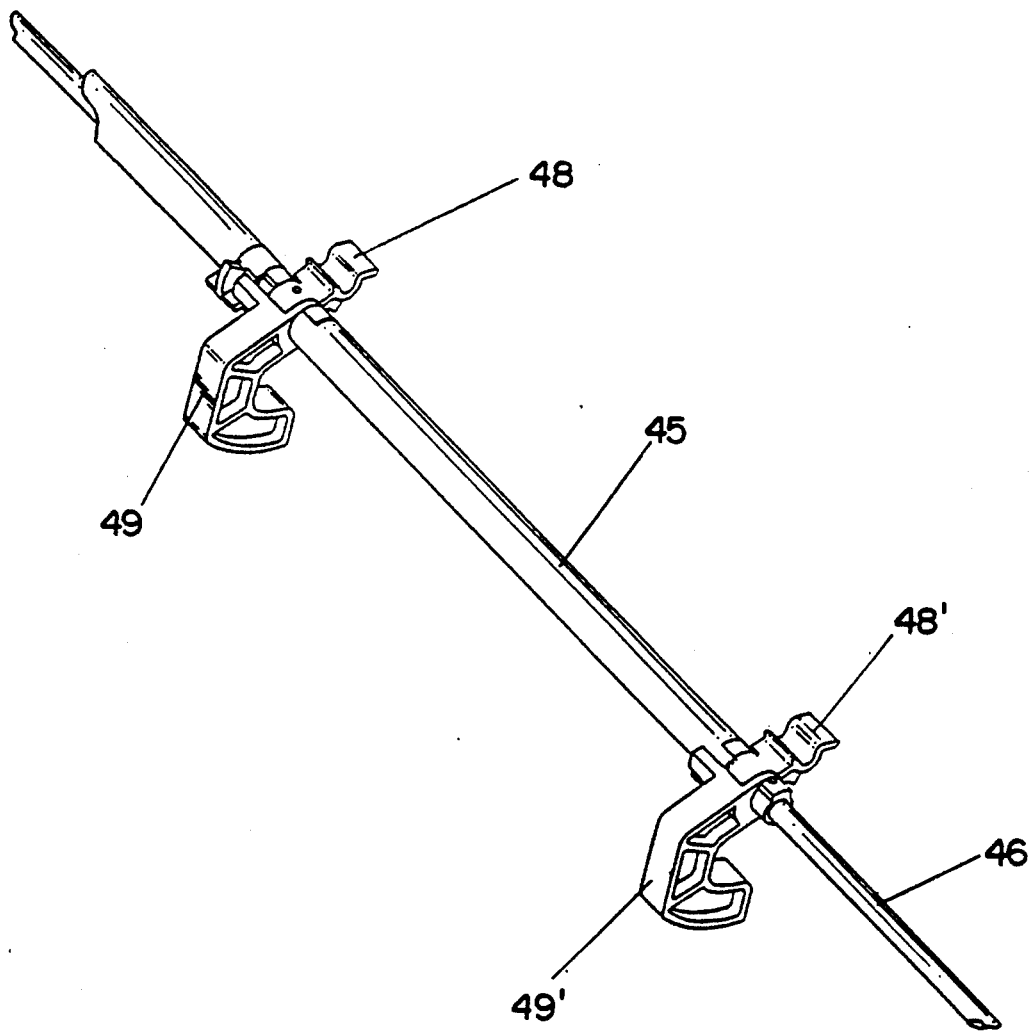
FIG. 9 is an enlarged scale view of a part of FIG. 8.

In FIGS. 5 to 9 which illustrate an interlock device, the same reference numbers are used to designate similar or identical parts to those of the circuit breaker illustrated by FIGS. 1 to 4, the reference numbers relating to the first circuit breaker being assigned with an index. A first circuit breaker 11′ and a second circuit breaker 11, only the molded cases 12, 12′ of which are sketched in FIG. 7, are fixed to a mounting plate 41, side by side by any suitable means. Each circuit breaker is equipped with a pre-tripping device like the one described above, and comprising a support 32 with a rocker 31 and transmission lever 30. In the fixed position of the circuit breakers 11, 11′ on the mounting plate 41, the rear panels 25 are pressed flat against the mounting plate 41, which comprises two orifices 42 in which the supports 32 engage. Each circuit breaker 11, 11′ is in addition equipped with a push-rod 43, 43′, one end of which is articulated on the handle 13, and the other end of which protrudes out from the rear panel 25, and penetrates into the orifices 42 of the mounting plate 41. The position of the push-rod 43 is representative of that of the circuit breaker contacts 52, i.e. of opening or closing of the circuit breaker.

The mounting plate 41 is fixed with small clearance on a parallel base plate 44 so as to arrange a gap between the mounting plate 41 and base plate 44, receiving a mechanical linking system between the two circuit breakers 11, 11′. This linking system is formed by two coaxial rotating bars, at least one of which in the form of a tube 45 surrounds the other in the form of a spindle 46. The spindle 46 is longer than the tube 45, and the parts which protrude out from each end of this tube 45 are mounted with rotation in bearings 47 fixed to the base plate 44. The spindle 46 pivots freely in the bearings 47, and the tube 45 pivots freely on the spindle 46. The tube 45 and spindle 46 extend transversely to the circuit breakers 11, 11′ and constitute respectively a first and a second mechanical link between these two circuit breakers. For this purpose, the tube 45 bears at one of its ends facing the orifice 42′ of the mounting plate 41, a first receiver crank 48′ and at the opposite end, facing the orifice 42, a second rotating cam 49. Likewise, the spindle 46 bears facing the orifice 42′, a first rotating cam 49′, and facing the orifice 42 a second receiver crank 48. The receiver cranks 48, 48′ have a recess housing the end of the push-rods 43, 43′ and it can easily be seen that movement of the push-rod 43′ of the first circuit breaker 11′ causes movement of the associated receiver crank 48′ and pivoting of the tube 45, whereas the push-rod 43 of the second circuit breaker 11 actuates the second receiver crank 48 and causes pivoting of the spindle 46. The rotating cams 49, 49′ cooperate with the associated rockers 31 to move the transmission levers 30 either to the inactive position or to the active position tripping the corresponding circuit breaker. The spindle 46 and tube 45 are urged in counterclockwise rotation in FIG. 5, by return springs 50 in such a way as to maintain the receiver cranks 48, 48′ pressed against the associated push-rods 43, 43′. The return springs 50 are located at the level of the bearings 47, the tube 45 then being extended by a sheath 51. The position of the receiver cranks 48, 48′ is representative of the position of the breaking contacts 52 of the associated circuit breaker, and in the closed position of these contacts, the receiver crank moves the associated rotating cam to a tripping position of the transmission lever 30.

Operation of the interlock device is explained hereafter, with reference to FIGS. 5 and 6, in which the parts 13′, 43′ and 48′ encircled by an unbroken line are represented in the position which they occupy in the first circuit breaker 11′, whereas the other parts are represented in the position occupied in the second circuit breaker 11. In FIG. 5, the first circuit breaker 11′ is open and the push-rod 43′ is held by the crank 13′ in a first raised position in FIG. 5. The mechanical link formed by the first receiver crank 48′, tube 45 and second rotating cam 49 makes a first position of the second rotating cam 49 correspond to this first position of the push-rod 43′ releasing the associated rocker 31 and the transmission lever 30 placed in a first inactive position, enabling normal opening and closing of the second circuit breaker 11. On closing or in the closed position of the first circuit breaker 11′, represented in FIG. 6, the crank 13′ moves the push-rod 43′ to the second lowered position bringing about clockwise rotation of the tube 45 to move the second rotating cam 49 to a second active position of engagement of the rocker 31 and upwards sliding of transmission lever 30 to a tripping position actuating the catch 22 to release the latch 21. In this position, the second circuit breaker 11 is automatically tripped and any closing operation is impossible, the latch 21 not being blocked. This first mechanical link comprising the tube 45 performs interlocking between the two circuit breakers 11′ and 11, in such a way that when the first circuit breaker 11′ is in the open position, the second circuit breaker 11 can be open or closed, but on the other hand if the first circuit breaker 11′ is closed, the second circuit breaker 11 must be open. The second mechanical link which comprises the spindle 46 provides a link between the circuit breaker 11 and 11′ in identical manner, in such a way that in the open position of the second circuit breaker 11, the first circuit breaker 11′ may be open or closed, but on the other hand in the closed position of the second circuit breaker 11, the first circuit breaker 11′ must be open.

This interlock device is particularly simple, and it can be added to standard circuit breakers, without any particular measures being required. The rocker 31 and transmission lever 30 can be used for other functions, notably for the pre-tripping function described with reference to FIGS. 1 to 4.

Figure 10:
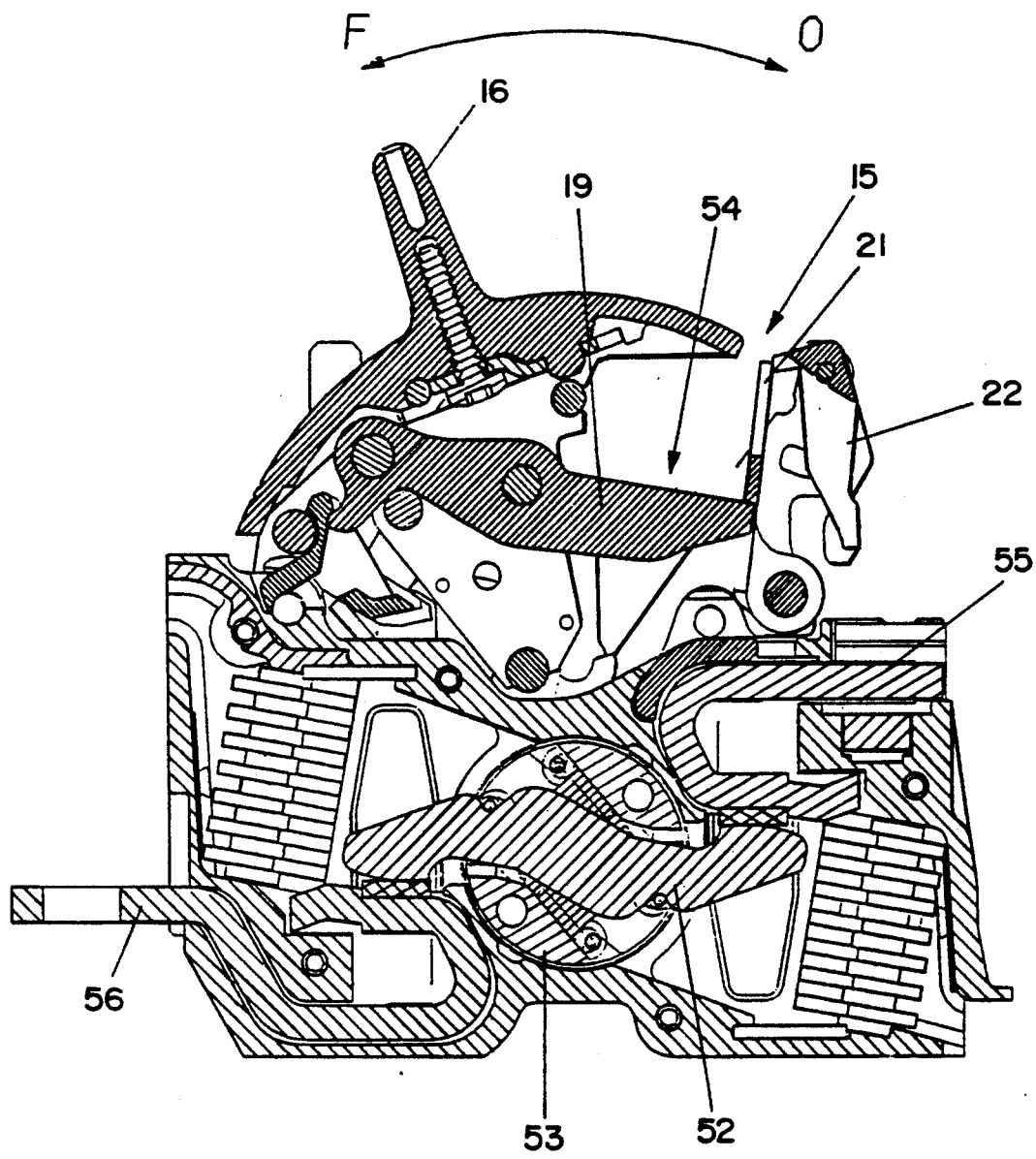
FIG. 10 is a cross-sectional view of a circuit breaker pole and of its operating mechanism.

The interlock device is advantageously used for circuit breakers of the type represented in FIG. 10, forming among other things the subject of the above-mentioned U.S. patent application Ser. No. 08/006,795, wherein the breaking contacts 52 are arranged as a contact bridge, rotatably mounted on a bar or bar section 53, securedly united to cranks 13 of the mechanism 15. The hook 19 has on its edge a resetting profile 54 arranged in such a way as to make the resetting position of the handle 16 coincide with its open position. An open circuit breaker is thus always ready to be closed, even if the associated circuit breaker has transmitted tripping orders by actuation of the transmission lever 30.

It is clear that the transmission system between the two circuit breakers can be achieved by two independent bars or by any other operative means and that the invention is in no way limited to the embodiment more particularly described herein.

We claim:

1. A draw-out low-voltage circuit breaker assembly, comprising:
   a connecting base comprising stationary draw-in contacts and a fixed cam;
   a circuit breaker which is movable between a drawn-in and a drawn-out position with respect to the connecting base, said circuit breaker comprising movable draw-in contacts for electrical connection to said stationary draw-in contacts in the drawn-in position, a molded case having a rigid bracket extending from a rear face of the molded case, said molded case housing breaking contacts and an operating mechanism connected to said breaking contacts for opening and closing said breaking contacts, and trip device means for opening the breaking contacts when a fault occurs; and
   draw-out breaking means for opening said breaking contacts via said trip device means upon separating the circuit breaker from the connecting base, said draw-out breaking means comprising a transmission lever having one end coupled to said trip device means, a rocker pivotally mounted to said rigid bracket and having first and second arms, said first arm being articulated to a second end of the transmission lever and said second arm bearing a pin member;
   wherein upon separating the circuit breaker from the connecting base, said pin member engages said fixed cam thereby rotating said rocker and sliding said transmission lever to engage said trip device means and open said breaking contacts, and wherein in the drawn-out position, said transmission lever is disengaged from said trip device means, enabling said circuit breaker to be freely opened and closed.

2. The assembly of claim 1, wherein the molded case has a parallelepipedic shape and comprises opposite front and rear panels, said moveable drawn-in contacts extending from said rear panel, a pivoting manual operating handle extending through said front panel, and said transmission lever protruding outwardly through said rear panel.

3. The assembly of claim 1, wherein said transmission lever is slidably mounted within an orifice extending through a rear panel of said molded case.

4. The assembly of claim 2, wherein the stationary draw-in contacts are shaped as tulip-fingers, said stationary draw-in contacts being extended by insulating guide sleeves for receiving and guiding said movable draw-in contacts to said stationary draw-in contacts.

5. The assembly of claim 4, wherein said movable draw-in contacts are stud-shaped.

6. The assembly of claim 5, wherein said movable draw-in contacts have a length such that said movable draw-in contacts engage said guide sleeves before said pin member engages said fixed cam when connecting said circuit breaker to said connecting base, and such that said movable draw-in contacts disengage from said guide sleeves after said pin member disengages from said fixed cam when separating said circuit breaker from said connecting base.

7. The assembly of claim 1, further comprising means for interlocking said circuit breaker to another circuit breaker.

8. The assembly of claim 1, wherein said first and second arms are substantially perpendicular to each other.

* * * * *